Figure 12:
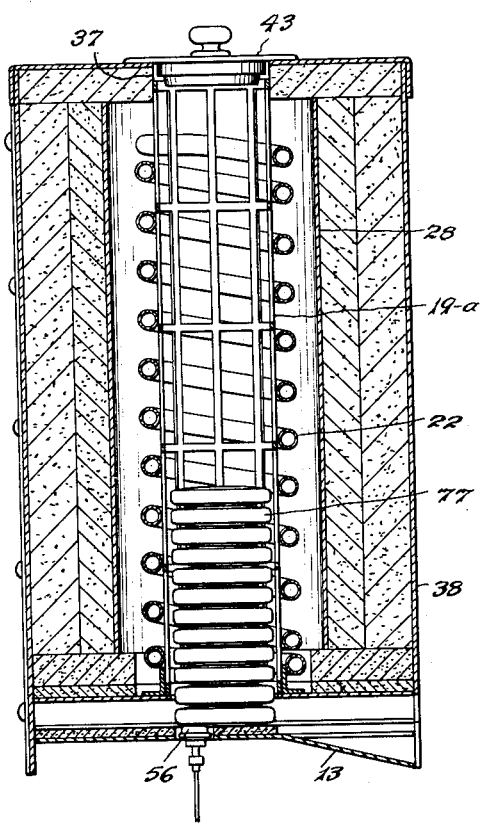

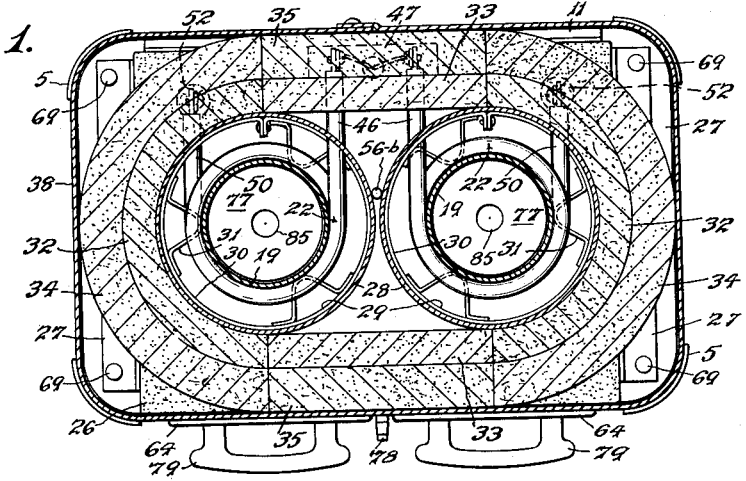

April 17, 1962 W. H. RUDOLPH ETAL 3,030,483
PELLET HEATER
Filed April 16, 1958 4 Sheets-Sheet 2
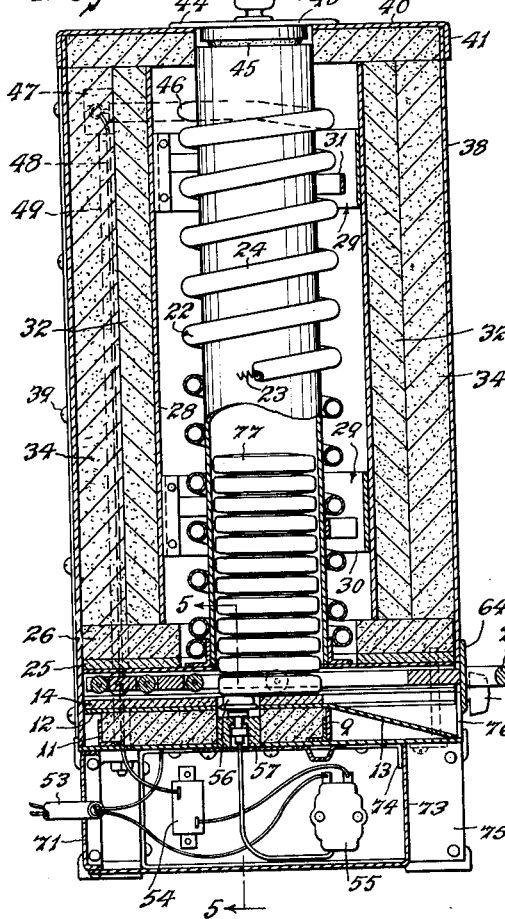
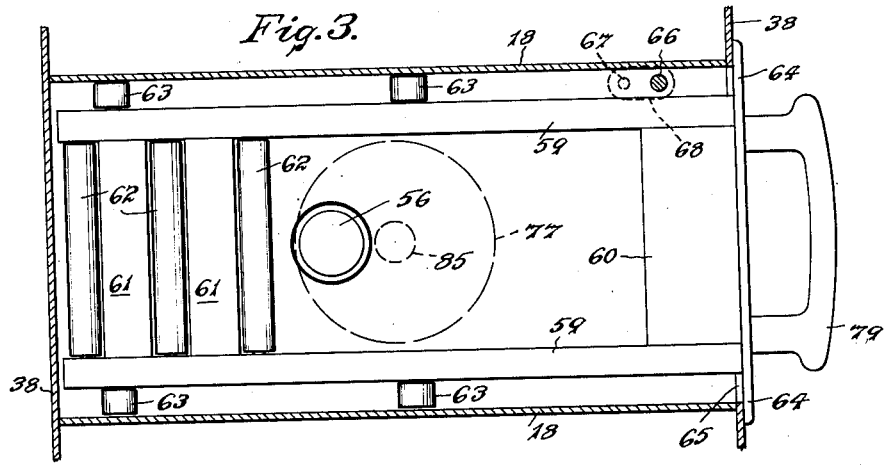
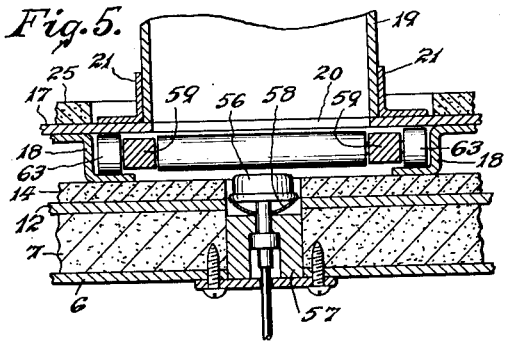
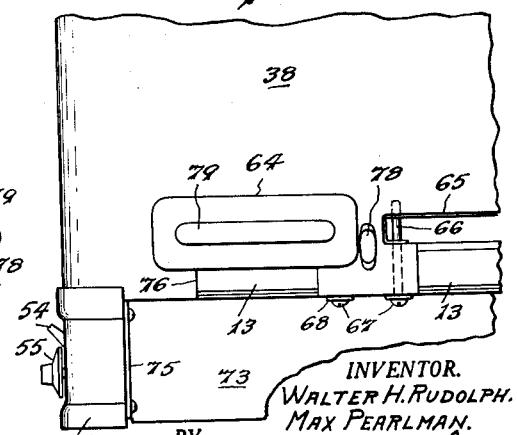
INVENTOR.
WALTER H. RUDOLPH.
MAX PEARLMAN.
BY Louis V. Lucia
ATTORNEY.

April 17, 1962 W. H. RUDOLPH ETAL 3,030,483
PELLET HEATER
Filed April 16, 1958 4 Sheets-Sheet 3
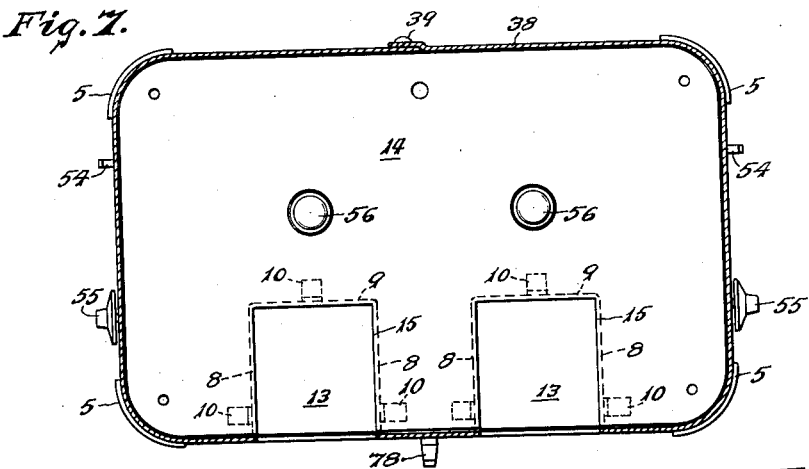
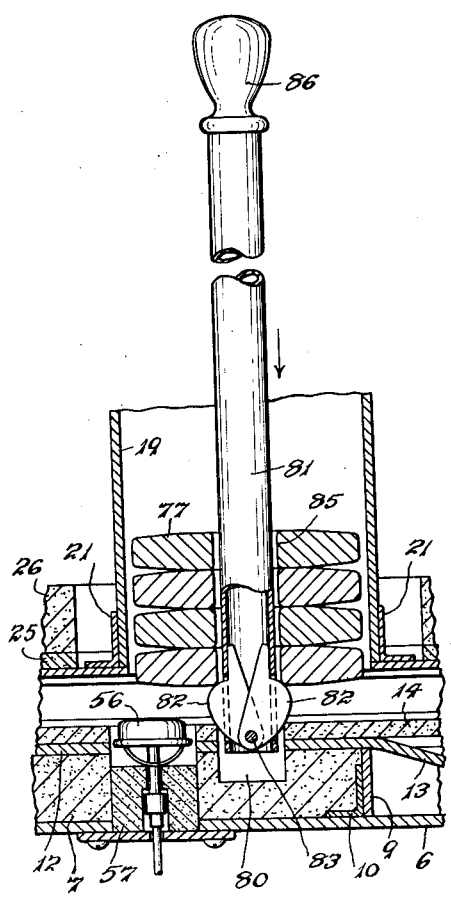
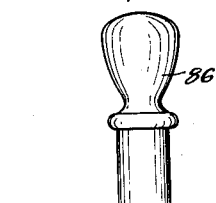
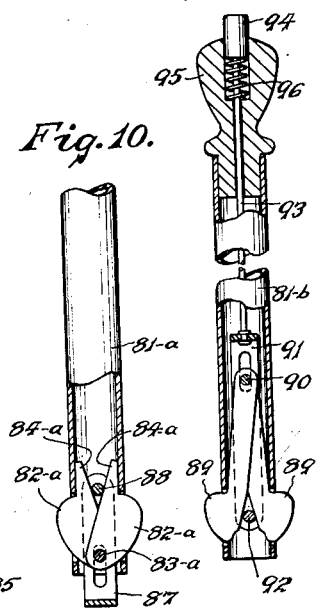
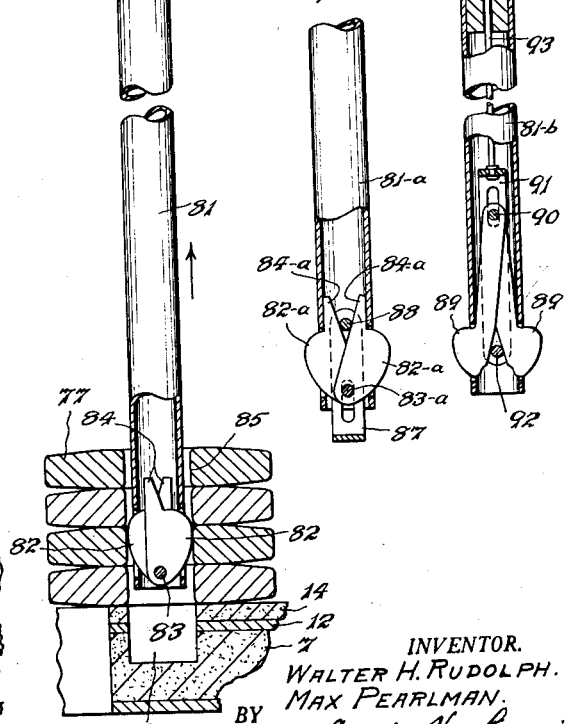
INVENTOR.
WALTER H. RUDOLPH.
MAX PEARLMAN.
BY Louis V. Lucia
ATTORNEY.

INVENTOR.
WALTER H. RUDOLPH.
MAX PEARLMAN.
BY Louis V. Lucia
ATTORNEY.

United States Patent Office 3,030,483
Patented Apr. 17, 1962

3,030,483
PELLET HEATER
Walter H. Rudolph, New York, N.Y., and Max Pearlman, Colonia, N.J., assignors to Rudo Associates, Newark, N.J.
Filed Apr. 16, 1958, Ser. No. 728,996
11 Claims. (Cl. 219—19)

This invention relates to a pellet heater and more particularly to a device for heating and dispensing pellets such as are suitable for keeping food warm.

Hospitals, restaurants and other food serving establishments, where the problem of keeping food servings warm has existed, have heretofore used a system whereby a pellet of a suitable material is heated and, when the food is being served, the said pellet is placed in the bottom of a suitable container. The plate containing the serving of food is then placed in the container, over the pellet, and covered with a cover that is provided for the container.

Although the use of such systems is very desirable, it has heretofore been found difficult to control the heating and supply of the pellets.

An object of this invention, therefore, is to provide a heater which will store such pellets, heat them to a predetermined temperature and dispense them, one at a time, directly into a food container with a minimum of delay and inconvenience to the user.

A further object of the invention is the provision of such a heater wherein the pellets are heated to a predetermined temperature under the control of the pellet which is next to be delivered from the heater.

A further object of the invention is the provision of a heater having one or more magazines in which a stack of pellets may be contained and in which the entire stack is preheated while the temperature of the bottommost pellet is raised to, and maintained at, a predetermined degree until it is dispensed from the said device.

A still further object of the invention is the provision of highly efficient and dependable means for heating a stack of pellets under the control of a sensing element which is responsive to heat in the bottommost pellet of said stack.

A further object is to provide such a heater which is thoroughly insulated to prevent the loss of heat and greatly increase the efficiency thereof and which is protected against overheating.

Another object of this invention is to provide a novel and improved means for conveniently loading the magazines of said heater with pellets that are to be heated.

Figure 13:
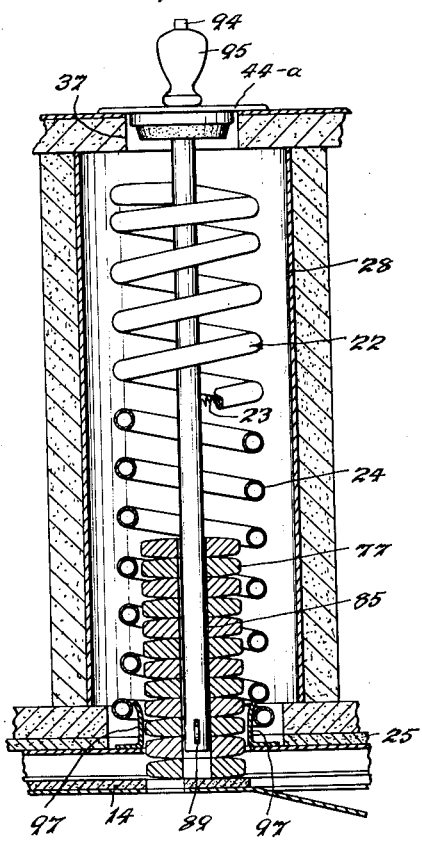
Figure 14:
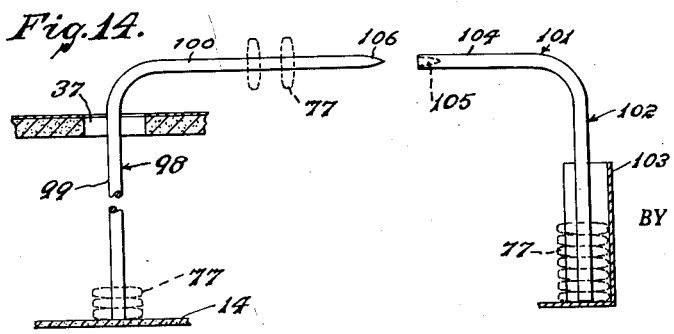

Further objects and advantages of the present invention will be more clearly understood from the following description and the accompanying drawings in which:

FIG. 1 is a sectional plan view on line 1—1 of FIG. 2.
FIG. 2 is a front view in central vertical section.
FIG. 3 is an enlarged plan view of the ejector slide with a portion of the casing being shown in section.
FIG. 4 is a sectional side view on line 4—4 of FIG. 2.
FIG. 5 is an enlarged fragmental view in section on line 5—5 of FIG. 4.
FIG. 6 is a fragmental front view of a lower portion of said device.
FIG. 7 is a sectional plan view on line 7—7 of FIG. 2.
FIG. 8 is an enlarged sectional side view illustrating a slightly modified form of said heater in cooperation with our device for loading a stack of pellets into the magazines of said heater.
FIG. 9 is a sectional side view showing the loading device as it is being withdrawn from the stack of pellets after said stack has been deposited upon the bottom of the magazine.
FIG. 10 is a sectional side view illustrating a modified form of said loading device.
FIG. 11 is a sectional side view of a further modified form of said loading device.
FIG. 12 is a sectional side view showing a modified form of magazine for said heater.
FIG. 13 is a sectional side view showing a further modified form of magazine.
FIG. 14 is a view illustrating another modified form of loading device.

In the embodiment of the present invention which is illustrated in the drawings, our improved pellet heater includes a base assembly having legs 5 upon which there is mounted a bottom plate 6 with an insulating plate 7 thereon which is cut out to provide notches in its front side to receive U-shaped members, each forming side walls 8—8 and a rear wall 9, that are secured to the bottom plate 6 by suitable means, such as clips 10; the said plate 7 being held against rearward movement on the plate 6 by means of an L-shaped retaining bar 11 which is also secured to the plate 6.

Upon the plate 7, there is mounted a chute plate 12 having chute portions 13 which are bent downwardly therefrom and fit between the side walls 8—8 of said U-shaped members and preferably rest upon the bottom plate 6 adjacent its front edge.

Upon the said chute plate 12, there is mounted a supporting plate 14 which is preferably of a hard asbestos material and is cut out to provide notches 15 in its front side aligning with the chutes 13.

A series of channel bars 16 are secured to a supporting plate 17 and provide spacers between said supporting plate and the plate 14 upon which it is mounted; the said spacers also including opposed pairs of L-shaped track portions 18 between the plates 14 and 17.

A pair of magazines are preferably provided in said heater and are mounted upon the supporting plate 17. Each of said magazines includes a vertically disposed tube 19 that preferably rests upon the plate 17, in alignment with an opening 20 therein, and is located upon said plate by means of clips 21 which are secured to the supporting plate 17 around the said opening.

Each of said tubes 19 is surrounded by an electric heating element 22 which includes an electrical resistance 23 contained within a helical conduit forming a coil having spaced convolutions 24 that fit snugly around the exterior of the tube. Upon the supporting plate 17, there is also mounted an intermediate plate 25 of a substantially hard asbestos material which underlies an insulating plate 26 of a relatively softer asbestos. The said plates 25 and 26 have openings therein in alignment with the openings 20 in the supporting plate 17 and are retained in position by means of positioning bars 27 which are also secured to the supporting plate 17.

The magazines are each surrounded by a tubular shell 28 which is coaxial with the tube 19 and forms a heating chamber which surrounds said tube and is heated by the heating element 22. The said shell is preferably spaced from the tube 19 of the respective magazine by means of a plurality of spacing collars 29, each of which includes a sleeve 30 that fits snugly within the shell 28 and has thereon spacing projections 31 that extend inwardly from the sleeve and abut the tube 19 to locate the shell 28 coaxially therewith.

The shells 28 rest upon a plate 26 of a suitable insulating material which serves to insulate the lower ends of the heating chambers from the base assembly. The sides of the magazines are insulated by a pre-formed inner layer of similar insulating material which includes a pair of semi-circular insulating plates 32, that are disposed against the outer side of the shell 28 of each magazine, and a pair of straight insulating plates 33 which extend between the ends of the said plates 32, at the front and rear of the shells 28, so that a pair of adjacent magazines are jointly enclosed and insulated by the said plates 32 and 33. In addition to said inner layer, there is also provided an outer layer of overlying plates 34 and 35 of similar material.

Upon and over the upper ends of the insulating plates 32 to 35 and the shells 28, there is mounted a top insulating plate 36 of similar material which closes the upper ends of the heating chambers surrounding the magazines and has a pair of openings 37—37 therein that are coaxial with the magazine tubes 19—19 and receive a portion of the upper ends of the said tubes for retaining the magazines in vertical position.

An outer casing 38 is provided for the said heater and rests upon the tops of the legs 5; said outer casing being preferably constructed of a single sheet of metal and having overlapping portions secured by screws 39 for binding the casing snugly around the insulating plates 32 to 35 and thereby retaining them in position around the magazines.

A cover plate 40 is mounted over the insulating plate 36 and has a surrounding flange 41 which overlaps the upper end of the casing 38. Said cover plate has a pair of openings therein which are in alignment with the openings 37 in the insulating plate 36 and receive covers 43, each of which has a surrounding flange 44, resting upon the cover plate 40, and includes a circular insulating plate 45 that depends into the upper end of its respective magazine tube 19.

The upper ends 46 of the heating elements extend through the rear insulating plates 33 and 35 into a recess 47 and said ends are connected to suitable conductor wires 48 which extend downwardly through a channel 49 in the rear insulating plate 35. The lower ends 50 of the said elements extend through the insulating plates 32 and are connected to electrical wires 51 which extend downwardly through recesses 52 in the insulating plates 32 and 34. All of the said wires 48 and 51 extend below the bottom plate 6 as clearly illustrated in the drawings.

The heating elements 22 of the two magazines shown in the drawings are preferably electrically wired to be connected to an electrical circuit, in parallel, by means of a conventional electric cord 53. Each of said heating elements is separately controlled by means of an electric switch 54 which is preferably wired in series with a conventional thermostat 55 that is controlled by a thermally responsive sensing element 56 that is mounted upon a supporting plug 57 secured to the bottom plate 6. The said sensing element is yieldingly supported by means of a spring 58 so that the top surface of said element is disposed slightly above the plane of the supporting plate 14.

A protective thermostat 55–b is provided as a safety measure to cause de-energization of the heating elements in the event that the shells 28 should become overheated. This thermostat 55–b is controlled by a sensing element 56–b which is preferably of the expanding rod type and mounted in contact with both of the shells 28—28 so as to break the electric supply circuit upon either of said shells becoming overheated.

An ejector unit is provided for dispensing pellets from our improved heater. As shown in FIG. 3, this unit includes a weighted frame having side bars 59—59 which are rigidly secured together by means of a front cross bar 60 and a pair of rear cross bars 61—61 which are purposely heavily constructed to add weight to the said frame for the purpose hereinafter described. A plurality of rollers 62 are disposed between the side bars 59 and rotatably mounted thereon. These rollers are adjacent to and project slightly above the top surfaces of the bars 61 so that they will support the pellets without letting them contact said surfaces. The said ejector unit is movably mounted upon the track portions 18 by means of wheels 63 which are rotatably secured to the opposed sides of the bars 59 and are of a larger diameter than the thickness of said bars 59 and 61 so as to support the ejector unit free of the track portions 18.

Upon the front end of each ejector unit, there is provided a front plate 64 which closes the access opening 65 in the front of the casing 38 when the said unit is in its normal position within the device.

Each ejector unit may be inserted into the device through the respective access opening 65 in the casing and, in order to movably retain it in its operative position, a stop is provided in the form of a bar 66 which is inserted in an opening that extends vertically through the bottom plate 6 and the plates 7, 12, 14, the track portions 18 and the plates 25 and 26. The said stop bar 66 is disposed in the path of the front wheels 63 of the respective ejector unit so as to stop outward movement thereof and thereby retain it in operative position within the device. Each of said stop bars is preferably secured in position by means of a screw 67 which extends through a tab 68 extending laterally from said stop bar and is threaded to the bottom plate 6.

The legs 5 of the device are secured to the bottom plate by means of bolts 69 that extend through all of the above mentioned plates that are included in the base and secure said plates together as a complete unit.

In order to close the bottom of the device, so as to enclose all of the electric wiring and accessories, side panels 70 are provided between the leg members and are ultilized for mounting the switches 54 and the thermostats 55. A rear panel 71 is also similarly provided between said legs at the rear of the device. The front of the space in the bottom of the device is closed by means of a bottom cover plate 72 which is secured to the lower edges of the panels 70 and 71 and has a front wall portion 73 that extends vertically and is secured to an angle bar 74 which is mounted on the bottom plate 6. The said wall portion 73 is disposed rearwardly of the front legs of the device and has forwardly extending side wall portions 75 which are secured to the inner sides of the front legs so as to form a recess under the chute 13 extending rearwardly of the front edge thereof and the pellet delivery opening 76 in the casing 38 which is provided in front of the chute 13.

The pellets for which this heater is designed are indicated at 77. These pellets are identical and each is in the form of a flat disc having an axial hole extending therethrough for a purpose to be hereinafter described. In order to minimize friction between said pellets, as the bottom one is being removed from the bottom of a pile, all of said pellets are slightly tapered to make their upper and lower surfaces convex so that, when the bottom pellet is slid out from under the pile, there will be a minimum area of contact between the top surface of the bottom pellet and the bottom surface of the next pellet above it. This taper is greatly exaggerated in the drawings but, in actual practice, it is preferably at an angle of as little as one degree from the axial hole to the peripheral edge of the pellet.

As clearly shown, particularly in FIGS. 8 and 9, the surface portions surrounding the axial hole on opposite sides of the pellet are parallel and provide flat portions which position the pellets parallel to each other and prevent them from tilting when stacked.

The ejector units may be secured in their normal positions by means of a cleat 78 which is pivotally mounted between the front plates 64—64 and may be rotated so as to overlie the adjacent edges of said plates and thereby retain both of the ejector units in their normal positions.

In the use of our improved pellet heater, as shown in FIGS. 1 to 9, the magazine tubes 19 are filled with stacks of the pellets 77, which will rest upon the supporting plate 14, and the heating elements are energized by closing the switches 54. Each of said stacks of pellets will then be heated under the control of the respective sensing element 56, which will respond to the temperature of the pellet in the bottom of the stack and thereby heat said pellets to a predetermined temperature for which the respective thermostat 55 was previously adjusted.

The heated pellets may be dispensed directly into the container for a food plate by simply placing said container under the chute 13 and against the wall portion 73 and then pulling the respective ejector unit forwardly by grasping its handle 79. This will cause the forward roller 62 to strike the bottom pellet in the stack with a hammer action and start the movement of said pellet forwardly from under the stack and move the flat surface portions of said pellet out of engagement with that of the pellet above it until the tapered surfaces of both pellets come into engagement and assist in the ejection of the bottom pellet while the remaining pellets in the stack are lifted upon the rollers 62 and will be supported thereon during the ejection of the bottom pellet. The pellet being ejected will then slide downwardly on the chute 13 and through the front opening 76 and fall into its correct position upon the bottom of the container being held under said chute. The ejector unit is then pushed inwardly to its normal position, allowing the stack to drop downwardly upon the supporting plate 14 so that the pellet then at the bottom of the stack will contact the sensing element 56.

It will be noted that the foremost roller 62 is spaced rearwardly from the bottom pellet when the dispensing unit is in its normal position. This allows forward movement of said unit to provide inertia to its weight to cause a hammer action for starting movement of the bottom pellet and thereby greatly facilitating the operation of removing said bottom pellet from the stack under the weight of the remaining pellets resting upon it.

It will also be understood that, after they are heated, said pellets may be rapidly dispensed by merely pulling forward on the respective handle 79, as far as allowed by the stop bar 68, and thereby rendering careful attention to the dispensing operation unnecessary.

In order to facilitate the loading of the magazines of our improved heater with stacks of pellets, the said heater may be modified to cooperate with a loading device such as clearly illustrated in FIGS. 8 and 9. As shown in FIG. 8, the heater is modified by shifting the sensing element 56 slightly further from the axis of the respective magazine and providing a recess 80 which extends through the plates 14 and 12 into the plate 7 and is coaxial with the magazine. The loading device shown in FIGS. 8 and 9 preferably comprises a tubular member 81 having adjacent its lower end a pair of oppositely disposed dogs 82 which are pivotally mounted upon a supporting pin 83 that extends through said tubular member. The said dogs project through opposed slots in the wall of the tubular member and each has an extension 84 which engages the inner side of the wall above the respective slot to provide stops for normally positioning the dogs in their operative position as shown in FIG. 8.

Each of the pellets 77 is provided with an axial hole which is adapted to receive the loading device therethrough.

In the use of said loading device, the pellets are previously placed in a suitable container which will support them stacked in a vertical or horizontal position and which may be provided with an opening in its supporting surface that will register with the holes 85 in the pellets. The loading device is then held by its handle 86 and its lower end is inserted through the stack of pellets until the dogs 82 are located below the bottom pellet and extended into their operative position. The entire stack of pellets may then be lifted by the handle 86 and lowered into the magazine until the dogs 82 abut the peripheral edge of the recess 80; whereupon, a slight downward movement of the loading device will cause the said dogs to swing inwardly in the member 81 and release the stack of pellets onto the bottom of the magazine. The said dogs will then take the position shown in FIG. 9, in which they will be retained by the walls of the openings in the pellets, and the loading device may be readily withdrawn in a vertical direction, leaving the stack in the magazine and upon the supporting plate 14.

It will be understood that the loading device shown in FIGS. 8 and 9 will operate in the above described manner even when some of the pellets from the previous stack still remain at the bottom of the magazine since the holes in said pellets will operate in the same manner as the recess 80 to close the dogs 82 and release the stack on the loading device.

In the modified form shown in FIG. 10, a U-shaped operating member 87 is slidably mounted over the supporting pin 83–a with its leg portions straddling the dog members 82–a—82–a and carrying a spreader pin 88 which extends across said leg portions and is normally disposed between the extensions 84–a—84–a. In this form, the said dog members may be retracted by simply pushing up on the member 87, squeezing the dog member into retracted position, and then releasing said dog members and allowing the pin 88 to drop between the extensions 84–a—84–a to retain them in said position. After the said loading device is inserted through the stack of pellets, the dog members are released and allowed to drop into their operative position by simply moving the operating member 87 upwardly. Upon lowering the stack into the magazine, the said operating member will contact the bottom of the magazine and cause downward movement of the loading device to remove the pin 88 from between the extensions 84–a—84–a and thereby allow the dog member to close and release the stack of pellets.

In the modified form of the loading device shown in FIG. 11, a pair of hook members 89—89 are pivotally mounted upon a supporting pin 90 and extend outwardly through opposed slots adjacent the bottom of the tubular member 81–b. An operating member 91 is slidably mounted over the pin 90 and carries at its lower end a spreader pin 92 which is disposed between opposed cam surfaces upon the inner edges of the members 89. The said operating member 91 is connected by means of a rod 93 to a pushbutton 94 which projects from a handle 95 and is urged upwardly by means of a spring 96 to normally retain the operating member in its raised position; thereby holding the hook members in their extended positions, as shown in FIG. 11. In this form of the loading device, the pushbutton 94 is first forced downwardly so as to lower the spreader pin 91 and thereby allow the hook members 89 to retract into the tubular member 81–b. The lower end of the loading device is then inserted through the stack of pellets until the said hook members are past the bottom of the stack. The button 94 is then released and the spring 96 will raise the spreader pin 92 and open the members 89 into their operating position shown in FIG. 11. When the stack is lowered to the bottom of the magazine, the pushbutton 94 is forced downwardly to lower the spreader pin 92 and thereby cause the hook members to close under the weight of the stack and deposit the stack in the magazine. The button 94 is then held downwardly until the loading device is withdrawn from the stack.

In the modified forms illustrated in FIGS. 10 and 11, it will not be necessary to provide the recess 80 in the bottom of the magazine, since the members 82–a and 89 are controlled by the operation of their respective spreader pins 83–a and 92 as above described.

As shown in the modified form of FIG. 12, the walls of the shells 28 are provided with a reflective inner surface and the magazine tube 19–a is constructed of a suitable perforate material such as perforated or expanded sheet metal, or a suitable type of wire mesh, so as to provide a wall that is mostly open and thereby materially increase the efficiency of the heater by exposing the stack of pellets directly to the infra-red heat rays which are reflected from the reflective surfaces of said shells through the spaces between the convolutions 24 and to the heat within the heating chamber surrounding it and thereby accelerating the heating of the pellets; this acceleration being aided by the taper in the surfaces of the pellets which allows said heat rays, as well as heat transferred by convection and eddies caused by turbulence within the heating chamber, to reach between the pellets and thus penetrate into the stack.

In the form illustrated in FIG. 13, the magazine tube is entirely omitted to completely expose the stack of pellets to the heat rays and the heat within the heating chamber. In this form, the pellets are retained in stacked position within the heating coil by means of a loading device similar to that shown in FIG. 11 but which is mounted upon the cover 44-a and depending therefrom to a point in the heating chamber at which the lower end of said device is above the lowermost pellet in the stack resting upon the supporting plate 14; the said stack being centralized in the heating chamber by means of suitable brackets 97 which surround the axial opening 20-a in the bottom of the heating chamber and engage one or more of the pellets next above the lowermost one and thereby also centralize the tubular member 81-c of said loading device and prevent displacement of the lower end of the stack when the lowermost pellet is being removed in a dispensing operation. It will be understood that, in this form, the loading device is used in the same manner as described for the one shown in FIG. 11 but it is allowed to normally remain in the position shown in FIG. 13 to centralize the stack and guide the downward movement of the pellets as they are dispensed.

In the said modified forms of FIGS. 12 and 13, a further advantage is gained by enabling the sensing element 56 to be more responsive to overheating within the respective heating chamber, and thereby providing a measure of safety, when the said chamber is empty of pellets, in addition to that provided by the sensing element 56.

For installations where there is limited head room above the heater, a simple form of loading device may be provided such as shown in FIG. 14.

This device includes a loading rod 98 having a vertical portion 99, which may be inserted into the heating chamber, and a portion 100 extending horizontally therefrom over the top of the heater. The pellets 77 are placed upon the horizontal portion 100 and slid onto the vertical portion 99, whereupon they will drop into the heating chamber in stacked position. If desired, an auxiliary loading rod 101 may be provided, said rod having a vertical portion 102 which may be inserted into a stack of cold pellets positioned in a suitable rack 103. The upper portion 104 of said loading rod is bent horizontally and has a suitable socket 105 to receive the pointed end 106 of the rod 98. The pellets from the stack in the rack 103 may then be simply slid upwardly on the portion 102, onto the rod 98 and into the heating chamber.

We claim:

1. A pellet heater including a base unit having a supporting plate thereon for supporting a stack of disc-shaped pellets, means on said base unit providing a heating chamber for containing said stack; said heating chamber having an electric heating element therein surrounding the stack and disposed adjacent thereto, dispensing means including an ejector unit movably mounted upon said supporting plate and having an opening therein for receiving the bottom of said stack, a roller on said ejector unit disposed adjacent to said opening and rearwardly of the stack for extracting the bottom pellet from said stack and ejecting it from the heater, and a plurality of other rollers on said ejector unit cooperating with said front roller for supporting the stack while the said bottom pellet is being extracted and until the ejector member is returned to its normal position.

2. A pellet heater including a base unit having a supporting plate thereon for supporting a stack of disc-shaped pellets, means on said base unit providing a heating chamber, a heating unit in said chamber for heating said stack, stationary means for supporting said stack vertically within the heating chamber, tracks on said supporting plate, dispensing means including an ejector unit slidably mounted on said tracks, said ejector unit having an opening therein to receive the bottom of the stack while resting upon said supporting means, said ejector unit being movable from a normal position for ejecting a pellet from the bottom of said stack, a chute below the said ejector unit for delivering the ejected pellet from the heater, and a plurality of rollers on said ejector unit normally disposed adjacent to the pellet at the bottom of the stack and adapted to support the stack while the said pellet is being ejected from the heater.

3. A pellet heater as set forth in claim 2 wherein one of said rollers is adapted to engage and eject the pellet at the bottom of the stack and is spaced from the pellet to allow free initial movement of the ejector unit before engagement of said roller with the pellet, to cause inertia in said dispenser unit for releasing said pellet under the weight of the pellet upon it and thereby facilitating the ejection of said pellet from the bottom of the stack.

4. A pellet heater including a base having a first supporting plate thereon, an insulating plate below said first supporting plate, a second supporting plate above and spaced from the first supporting plate, a second insulating plate resting upon the second supporting plate, a tubular shell resting upon said second insulating plate and forming a heating chamber, insulating means surrounding said heating chamber, the said second supporting plate having an opening therein to receive a stack of pellets resting upon the first supporting plate and disposed within the heating chamber, an electric heating coil extending vertically above and surrounding the said opening, an upper insulating plate extending over the heating chamber and having an opening therein in axial alignment with the opening in the second supporting plate, a cover plate above said upper insulating plate and having an opening in alignment with the opening therein, a removable cover upon said cover plate for closing the opening therein and in the upper insulating plate, means for supporting the stack of pellets vertically within the said heating coil and guiding it upon the first supporting plate through the opening in the second supporting plate, and a chute disposed below the first supporting plate.

5. A pellet heater including a base having a supporting plate thereon, a pair of tubular shells forming separate heating chambers above said supporting plate, a separate heating element in each of said chambers, means for supporting a stack of pellets vertically within each of said heating chambers and guiding said stack upon said supporting plate, a thermostat including a sensing element responsive to the temperature of the bottom pellet in said stack for controlling the energization of said heating element, and a separate thermostat including a sensing element responsive to overheating of said tubular shells beyond a predetermined temperature for also controlling the energization of the heating element.

6. A pellet heating and dispensing device including a base having a bottom plate, an insulating plate upon said bottom plate, a chute plate mounted upon said insulating plate and having a portion thereof bent downwardly and resting upon the bottom plate to provide a chute, a first supporting plate resting upon said chute plate, a second supporting plate above and spaced from the first supporting plate, the said second supporting plate having an opening therein, a plate of insulating material resting upon the said second supporting plate, a tubular shell resting upon said insulating material and providing a heating chamber above said supporting plates, an electric heating coil in said chamber, means for supporting a stack of pellets vertically within said coil and guiding said stack through the opening in the second supporting plate onto the first supporting plate, an insulating plate resting upon the said tubular shell and having an opening therein to the heating chamber for the insertion of the stack into the heating chamber, a cover for said opening to the heating chamber, a casing surrounding said heater and having a delivery opening therein in alignment with the said chute, and ejector means between said first and second supporting plates for ejecting the pellet at the bottom of the stack onto said chute.

7. A pellet heating and dispensing device including a base having a bottom plate, an insulating plate upon said bottom plate, a supporting plate upon said insulating plate, a heating chamber above said supporting plate, a heating element in said chamber for heating a stack of pellets therein, an electric circuit for energizing said heating element, a thermostat connected in series in said circuit and responsive to a sensing element adapted to contact the bottom pellet of said stack for controlling said circuit in accordance with variations in the temperature of said bottom pellet, the said sensing element being disposed within an opening extending through the said bottom, insulating and supporting plates and being yieldably supported upon a plug disposed in said opening and secured to the bottom plate, an ejector for ejecting the pellet resting upon the supporting plate, and a chute for delivering said pellet from said device.

8. A pellet heater including a supporting plate, a heating chamber above said supporting plate and having an opening in the bottom thereof to receive a stack of pellets resting upon said supporting plate, a heating element in said heating chamber coaxial with and disposed above said opening in the bottom thereof, the said heating chamber having an opening in the top thereof, a tubular guide member having its lower end resting upon the bottom of the heating chamber and coaxial with the opening therein, the upper end of said tubular member extending into the opening in the top of the heating chamber for retaining said member vertically in the heating chamber, a cover for the opening in the top of said chamber, the said tubular member being constructed of perforate material providing a mostly open wall structure whereby pellets contained within said tubular guide members are exposed directly to heat in said heating chamber, and means for dispensing said pellets from the bottom of the stack.

9. A pellet heater including a base, a first supporting plate, a second supporting plate above and spaced from the first supporting plate, the said second supporting plate having an opening therein to receive a stack of pellets resting upon the first supporting plate, a heating chamber above said second supporting plate and surrounding said opening, a heating coil coaxial with said opening and disposed vertically within the heating chamber, an opening communicating with the upper end of said heating chamber, a cover for said opening in the upper end of the heating chamber, and a guide member depending from said cover and extending into pellets disposed within the opening in the second supporting plate for centralizing the stack within the heating coil, and means for dispensing the bottom pellet from said stack.

10. A heater for disc-shaped pellets including a casing, a tubular shell forming a heating chamber in said casing and having a reflective inner surface, an open electric heating coil disposed centrally within said heating chamber having spaced convolutions, and means for supporting a stack of said pellets within said coil whereby the pellets are exposed directly to convected heat from the heating coil and to infra-red heat rays reflected from said reflective surface through the spaces between said convolutions.

11. A pellet heater including a base, a first supporting plate, a second supporting plate having an opening therein to receive a stack of pellets resting upon the first supporting plate, a heating chamber above said second supporting plate and surrounding said opening, a heating coil coaxial with said opening and disposed vertically within the heating chamber, an opening communicating with the upper end of said heating chamber, a cover for said opening in the upper end of the heating chamber, guide means surrounding said opening in the second supporting plate for guiding the stack of pellets therethrough and centralizing said stack relatively to the heating coil, a guide member depending from said cover and extending into the pellets disposed within said guide means to thereby centralize the stack within the heating coil, and means for dispensing the bottom pellet from said stack.

References Cited in the file of this patent

UNITED STATES PATENTS

| | | |
|---|---|---|
| 431,366 | Lang | July 1, 1890 |
| 1,804,393 | Aubel et al. | May 12, 1931 |
| 1,851,116 | Spiro | Mar. 29, 1932 |
| 1,979,613 | Goggins | Nov. 6, 1934 |
| 2,192,732 | Johnson | Mar. 5, 1940 |
| 2,576,874 | Acton | Nov. 27, 1951 |
| 2,601,852 | Wendt | July 1, 1952 |
| 2,621,655 | Olson | Dec. 16, 1952 |
| 2,634,156 | Crimmel | Apr. 7, 1953 |
| 2,721,729 | Van Riper | Oct. 25, 1955 |
| 2,744,946 | Lewicki | May 8, 1956 |
| 2,752,219 | Yonkers | June 26, 1956 |
| 2,786,930 | Weber et al. | Mar. 26, 1957 |
| 2,819,819 | Warren | Jan. 14, 1958 |
| 2,831,098 | Luscher | Apr. 15, 1958 |
| 2,908,791 | Torino et al. | Oct. 13, 1959 |
| 2,912,558 | Root | Nov. 10, 1959 |